US008966442B2

(12) United States Patent
Eska et al.

(10) Patent No.: US 8,966,442 B2
(45) Date of Patent: Feb. 24, 2015

(54) CUSTOM CODE INNOVATION MANAGEMENT

(75) Inventors: Veit Eska, Malsch (DE); Christoph Vehns, Mannheim (DE)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 13/222,907

(22) Filed: Aug. 31, 2011

(65) Prior Publication Data

US 2013/0055235 A1 Feb. 28, 2013

(51) Int. Cl.
*G06F 9/44* (2006.01)

(52) U.S. Cl.
CPC .................................... *G06F 8/751* (2013.01)
USPC ........................................................ 717/120

(58) Field of Classification Search
USPC ........................................................ 717/173
See application file for complete search history.

(56) References Cited

U.S. PATENT DOCUMENTS 5,313,387 A 5/1994 Mckeeman et al.
6,226,792 B1 5/2001 Goiffon et al.
6,993,530 B2 1/2006 Lee et al.
7,421,715 B1 9/2008 Margulis et al.
7,434,200 B2 10/2008 Bender
7,509,540 B1 3/2009 Lovy et al.
2003/0033590 A1 2/2003 Leherbauer
2004/0153994 A1* 8/2004 Bates et al. .................. 717/110
2006/0041881 A1* 2/2006 Adkasthala .................. 717/168
2006/0294158 A1 12/2006 Tsyganskiy et al.
2009/0063584 A1 3/2009 Abzarian et al.
2009/0112460 A1 4/2009 Baker et al.
2009/0132815 A1 5/2009 Ginter et al.
2010/0185682 A1 7/2010 Grinshpun et al.
2010/0185963 A1 7/2010 Slik et al.
2011/0154311 A1* 6/2011 Acker et al. .................. 717/168
2012/0185827 A1 7/2012 Eska et al.

OTHER PUBLICATIONS

"U.S. Appl. No. 13/006,059, Examiner Interview Summary mailed Jul. 18, 2013", 3 pgs.
"U.S. Appl. No. 13/006,059, Final Office Action mailed Sep. 26, 2013", 29 pgs.
"U.S. Appl. No. 13/006,059, Non Final Office Action mailed Apr. 25, 2013", 26 pgs.
"U.S. Appl. No. 13/006,059, Response filed Jul. 16, 2013 to Non Final Office Aciton mailed Apr. 25, 2013", 14 pgs.
"U.S. Appl. No. 13/006,059, Response filed Nov. 26, 2013 to Final Office Action mailed Sep. 26, 2013", 14 pgs.

(Continued)

*Primary Examiner* — Li B Zhen
*Assistant Examiner* — Joanne Macasiano
(74) *Attorney, Agent, or Firm* — Schwegman Lundberg & Woessner, P.A.

(57) ABSTRACT

A method to manage program code that runs in a computer system comprising: producing a transfer template information definition structure in a computer readable storage device that includes a provider code attribute a similarity measure attribute and at least one results attribute; producing a transfer instance of the transfer template information definition structure that associates a provider code object identified as corresponding to the respective managed code object with the provider object code attribute and that associates the determined measure of similarity with the similarity measure attribute; using the transfer instance to obtain results information from a provider system that includes information about the provider code object.

17 Claims, 14 Drawing Sheets

(56) References Cited

OTHER PUBLICATIONS

"U.S. Appl. No. 13/006,059, Advisory Action mailed Feb. 13, 2014", 4 pgs.

"U.S. Appl. No. 13/006,059, Examiner Interview Summary mailed Feb. 6, 2014".

"U.S. Appl. No. 13/006,059, Response filed Mar. 26, 2014 to Advisory Action mailed Feb. 13, 2014", 10 pgs.

* cited by examiner

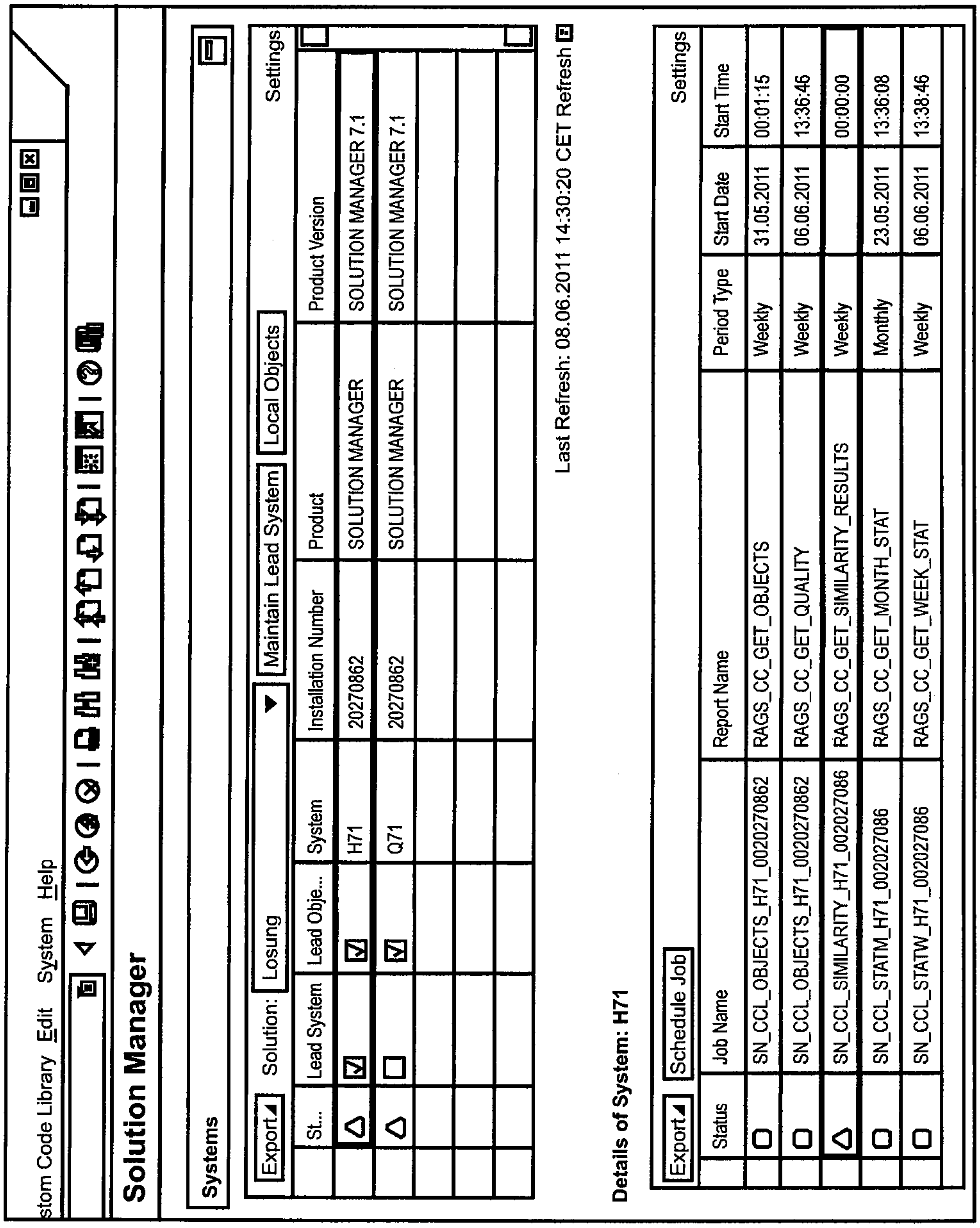

Figure 7

Solution Manager

Systems

| St... | Lead System | Lead Obje... | System | Installation Number | Product | Product Version |
|---|---|---|---|---|---|---|
| △ | ☑ | ☑ | H71 | 20270862 | SOLUTION MANAGER | SOLUTION MANAGER 7.1 |
| △ | ☐ | ☑ | Q71 | 20270862 | SOLUTION MANAGER | SOLUTION MANAGER 7.1 |
| | | | | | | |
| | | | | | | |

Last Refresh: 08.06.2011 14:30:20 CET Refresh

Details of System: H71

| Status | Job Name | Report Name | Period Type | Start Date | Start Time |
|---|---|---|---|---|---|
| ☐ | SN_CCL_OBJECTS_H71_0020270862 | RAGS_CC_GET_OBJECTS | Weekly | 31.05.2011 | 00:01:15 |
| ☐ | SN_CCL_OBJECTS_H71_0020270862 | RAGS_CC_GET_QUALITY | Weekly | 06.06.2011 | 13:36:46 |
| △ | SN_CCL_SIMILARITY_H71_002027086 | RAGS_CC_GET_SIMILARITY_RESULTS | Weekly | | 00:00:00 |
| ☐ | SN_CCL_STATM_H71_002027086 | RAGS_CC_GET_MONTH_STAT | Monthly | 23.05.2011 | 13:36:08 |
| ☐ | SN_CCL_STATW_H71_002027086 | RAGS_CC_GET_WEEK_STAT | Weekly | 06.06.2011 | 13:38:46 |

CUSTOM CODE INNOVATION MANAGEMENT

CROSS-REFERENCE TO RELATED APPLICATION

This application is related to U.S. patent application Ser. No. 13/006,059, filed Jan. 13, 2011, entitled CUSTOM CODE LIFECYCLE MANAGEMENT, which is expressly incorporated herein by this reference.

BACKGROUND

In a computer system configured to implement an object oriented program environment, custom objects may be created that may comprise new objects and that may comprise existing objects that have been modified. In the meantime, a provider of objects may create or modify objects that have functionality that is the same or similar to the custom objects. As a result, both custom objects and provider objects may be available to address the same or similar functionality. Creation and maintenance of custom objects can be expensive and time consuming, and therefore, there can be an advantage to using a provider object instead of a similar custom object. However, the user of the custom objects may not be aware of the availability of the provider objects, and the provider of the provider objects may not be aware of the custom objects. Therefore, there has been a need to inform the users of custom objects of the availability of provider objects that duplicate or substantially duplicate custom object functionality.

SUMMARY

In one aspect, a method is provided to manage program code that runs in a computer system. A transfer template information definition structure associated with a managing system identifies respective managed code objects that run on the managed system and includes a provider code attribute to identify provider code objects that correspond to respective managed code objects and includes a similarity measure attribute to provide indications of similarity between the respective managed code objects and corresponding provider code objects and includes at least one results attribute to indicate respective results for respective managed code objects. A transfer instance associates the provider code object identified as corresponding to the respective managed code object with the provider object code attribute and associates a determined measure of similarity with the similarity measure attribute. The transfer instance is transferred to a provider system. Results information stored by the provider system is associated with a results attribute in the transfer instance. The transfer instance is transferred back to the managing system.

BRIEF DESCRIPTION OF THE DRAWINGS

FIG. 7 is an illustrative drawing of an example user interface screen display screen in which a user of the managing system can designate a managed system from which to collect similarity information in accordance with some embodiments.

DESCRIPTION OF THE EMBODIMENTS

The following description is presented to enable any person skilled in the art to create and use a computer system configuration and related method and article of manufacture to monitor and manage custom code running within a computer system during a lifecycle of the code. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Introduction

Figure 1:
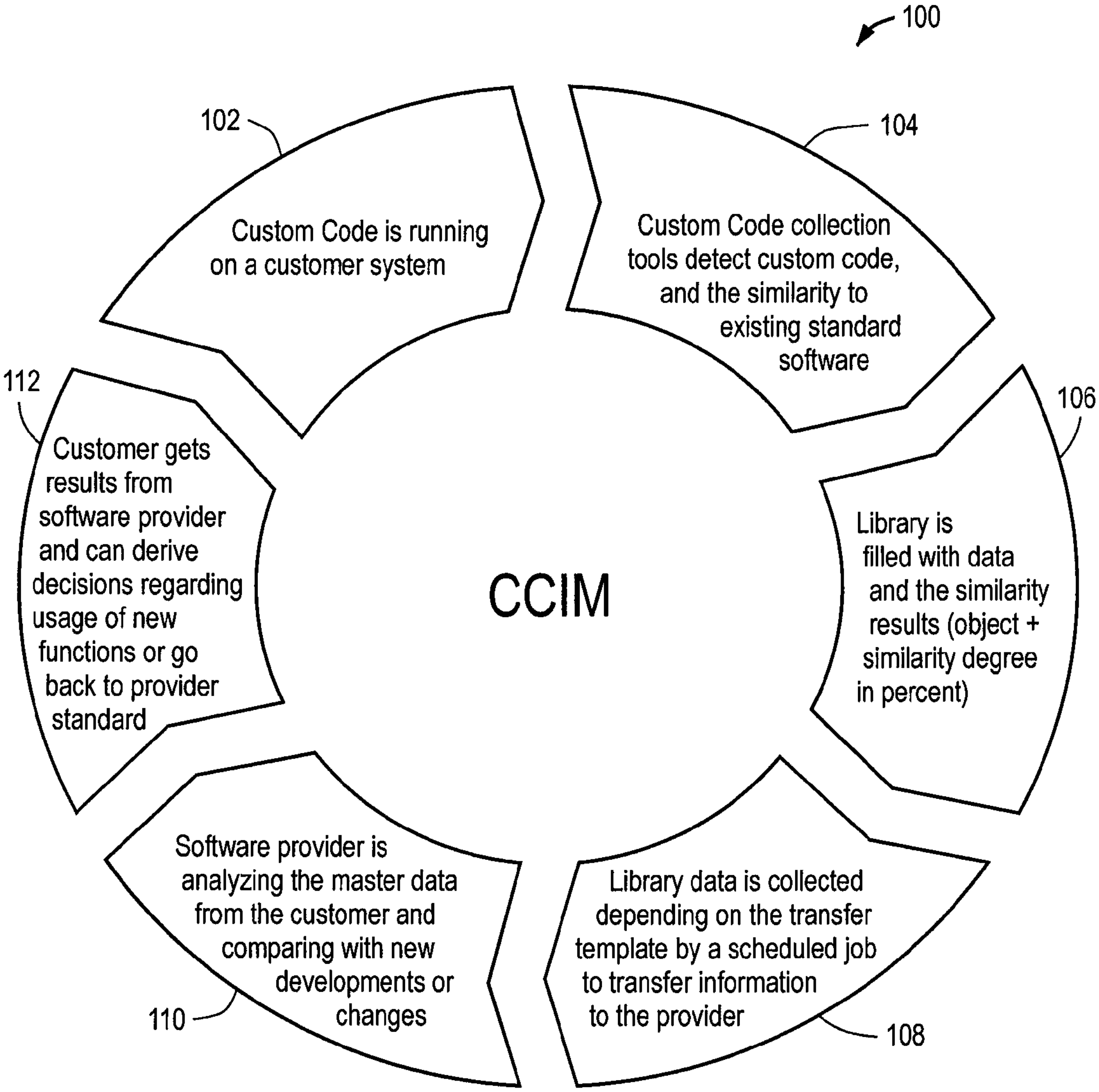
FIG. 1 is an illustrative drawing of a custom code innovation management process in accordance with some embodiments. In stage 102 of the cycle, custom code runs on a customer computer system.

FIG. 1 is an illustrative drawing of a custom code innovation management process in accordance with some embodiments. In stage 102 of the cycle, custom code runs on a customer computer system. Custom code is also referred to as 'managed code' herein. In stage 104, managed code collection tools detect the managed code that is running on the system and the similarity of that managed code to provided code that is provided by a software provider who provides software that is standardized for use by multiple customers. In stage 106, data from the extraction is loaded and saved in the library. In stage 108, a transfer template library structure is loaded with data indicating the provided code object that is similar to a managed code object and a measure of similarity, and the transfer template library structure data is transferred to a provider computer system. In stage 110, the transferred data is analyzed to determine whether there is new provider information in storage accessible to the provider computer system that is associated with the identified provider code. In stage 112, the provider sends results information to the customer computer system. The results information provides information about the identified provided code. The results information is loaded into the transfer template library structure on the customer computer system. It will be understood that the cycle is merely illustrative and the occurrence, ordering and details of events may vary.

System Architecture

Figure 2:
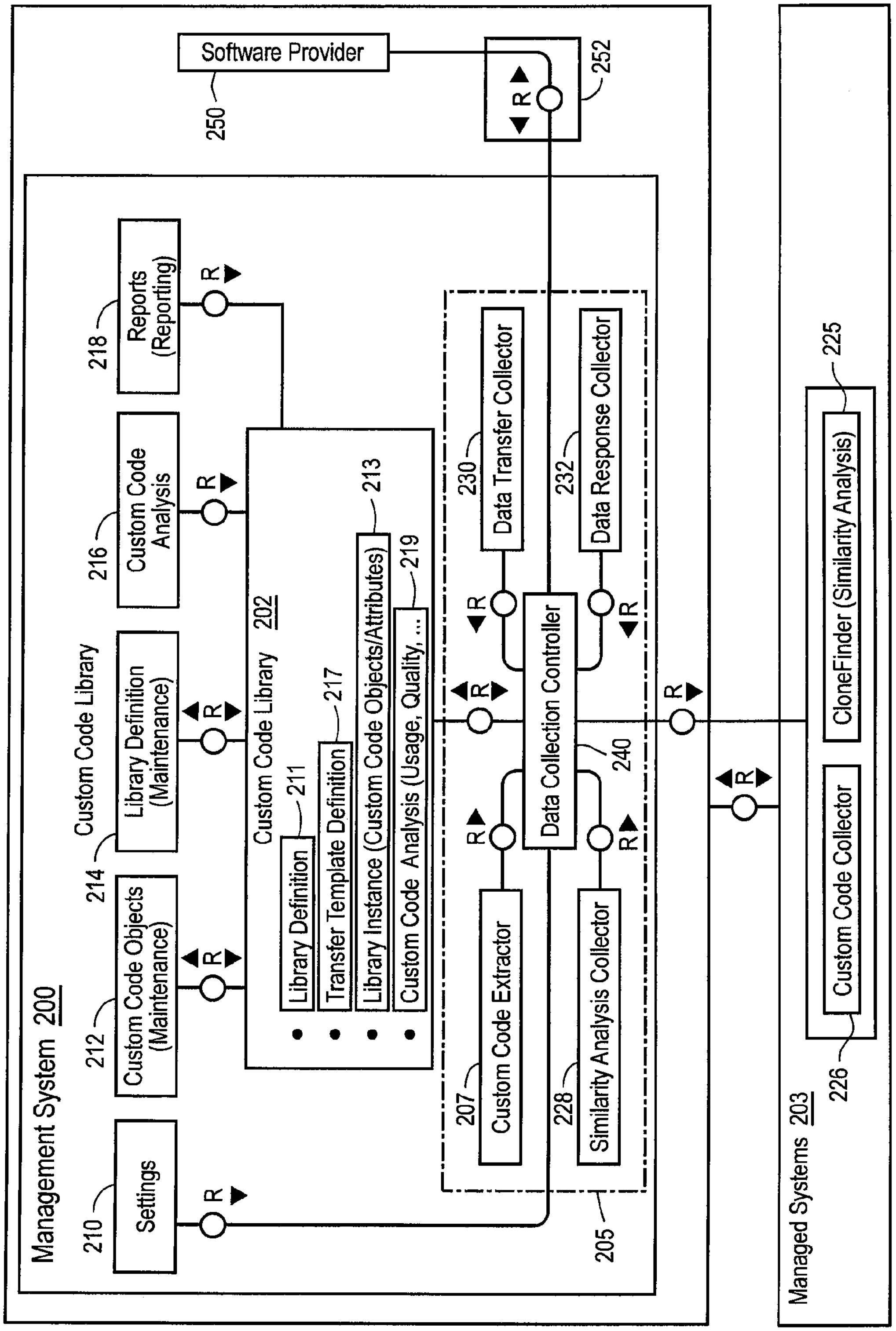
FIG. 2 is an illustrative drawing that shows an architecture level functional view of a management system, a managed system on which managed/custom code runs and a provider system that manages assembly of information about provided code determined to be similar to managed code.

FIG. 2 is an illustrative drawing that shows an architecture level functional view of a management system 200 to manage custom computer program code and to provide a transfer template structure to receive information indicating similarity between managed code and provided code, a managed system 203 on which managed/custom code runs and a provider system 250 that manages assembly of information about provided code determined to be similar to managed code. The managing system 200, the managed system 203 and the provider system 250 each comprise computer hardware configured using computer program code to implement the modules, information structures, objects, tables and functions described herein. The custom code management system includes a custom code library module 202, user interface control modules, 210, 212, 214, 216 and 218. The custom/managed code management system 200 also includes custom code collector module 207, similarity analysis collector 228, data transfer collector 230, data response collector 232 and data collection collector controller 240, all shown within dashed lines 205. The managed system 203 includes a custom code collector 226 that identifies custom code objects running on the managed system 203 and a clone finder 225 that performs similarity analysis. As explained below, the managed system 203 is the processing system that information is extracted from and that runs custom code that is or may be similar to provided code. The provider system 250 receives similarity information from the custom code management system and produces information concerning provided code determined to be similar to custom code running on the managed system 203. This information exchange is predicated upon agreement between the software provider 250 and the acceptance of the trusted transfer template 217 which is part of the custom code library module 202.

The custom code library module 202 is central to the system architecture 200. The library module 202 includes a library definition management information structure 211 that corresponds to configuration of the managed system 203 and that is used to direct extraction of information about managed/custom code from the managed system 203. It will be appreciated that the managed code configures the managed system 203 to perform various specific tangible acts. The library module 202 includes a transfer template information definition structure 217 that has the same structure (i.e. the same tables) as the library definition information structure 211 but includes other attribute information for use in evaluation by the provider system 250 and includes attribute information produced by the provider system 250 for use by the managed system 203 or by mangers of that system 203. The library module 202 includes custom code similarity results information structure 219. The library module 202 includes a master object data information structure 213 to where instance data depending on definitions 211 and 217 are stored create relations between objects that correspond to managed code running on the managed system 203 and attributes of the managed code. The collector modules 205 are directed to managing the library and to controlling input to and output from the library 202. The custom code collector module 207 is used to gather information concerning managed code from within the managed system 203 for input to the library 202. Similarity analysis collector module 228 compares the custom code with provider code and provides a similarity measure (for example, 83%). Data transfer collector module 230 looks for information in the library module 202 regarding the transfer template definition module 217. The library instance data 213 and 219 are scanned and collected and at the end saved in a file encoded with a markup language for data transfer. In some embodiments, the markup language is xml. Data response collector module 232 receives an xml file from the software provider 250. Furthermore, the data are extracted and put in the library 202. Data collection controller module 240 manages at which time and on which regular bases the collectors 207, 228, 230 and 232 are run. Furthermore, module 240 handles the logging mechanism (enqueue) of the library module 202. A postbox system 252 is used to transfer similarity and results information between the managing system 200 and the provider system 250. Details of the library module 202 will be described next before continuing with a description of operation of the system architecture 200.

Data Structures

Figure 3:
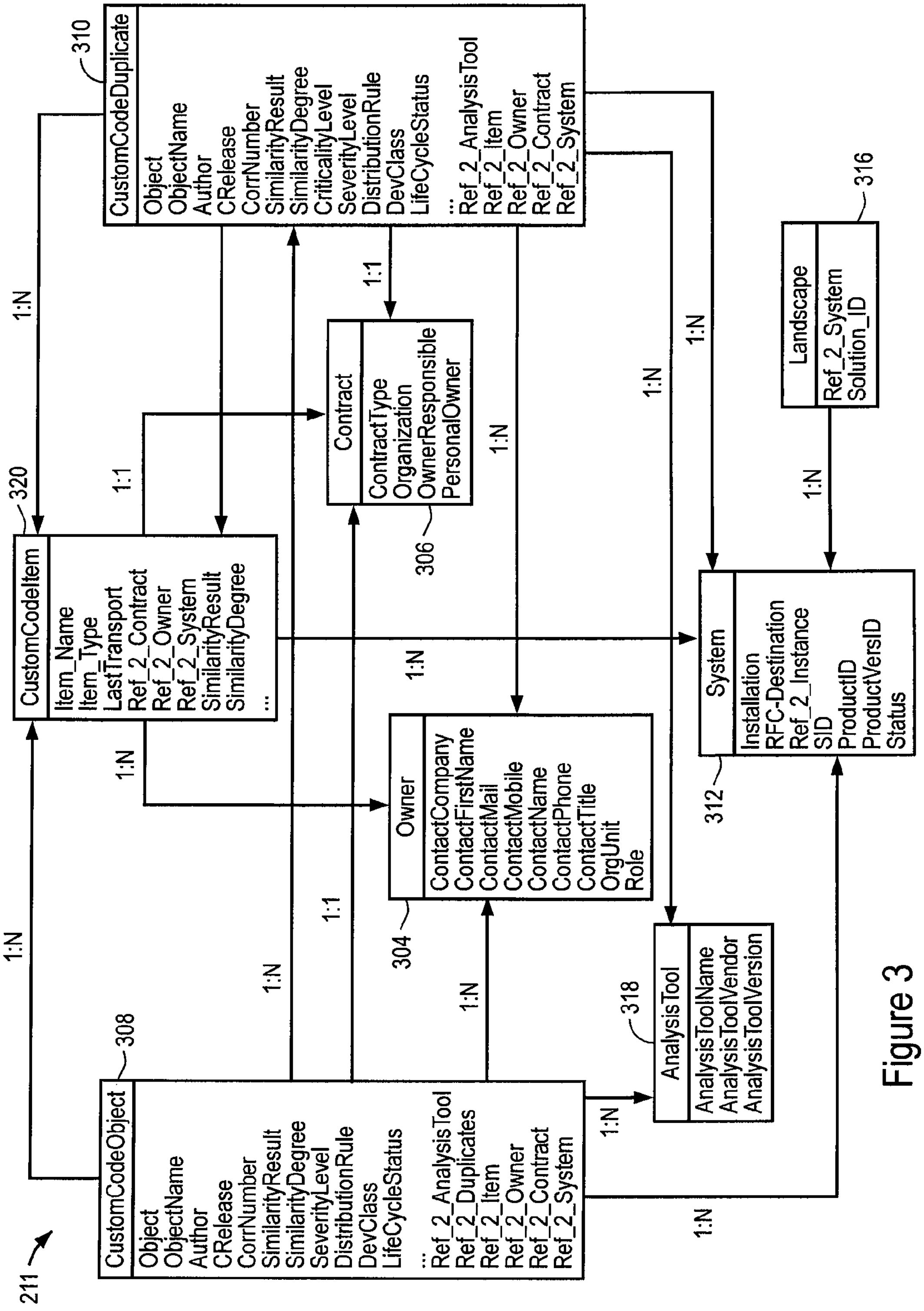
FIG. 3 is an illustrative drawing of a library definition management information structure used to direct extraction of information about managed code from the managed system in accordance with some embodiments.

FIG. 3 is an illustrative drawing of a library definition management information structure 211 used to direct extraction of information about managed code from the managed system 203 in accordance with some embodiments. In some embodiments, the management information structure 211 corresponds to configuration of the managed system 203 and that is used to direct extraction of information about managed/custom code from the managed system 203. The management information structure 211 also is referred to herein as a 'library instance'. The management information structure 211 comprises a set of objects, attributes and their relationships. It is of course possible to define other objects, attributes and relationships which constitute another instance. In some embodiments, the management information structure 211 is encoded in a computer readable storage device and includes object structures identified in the following Table 1. As explained in more detail below, the management information structure 211 comprises a template, i.e., collection and organization, of object structures used collectively, for example, to indicate authorization (e.g., contract and ownership), location or context (e.g., system, landscape, instance), analysis tool and duplicates. The collection and organization of objects within the management information structure 211 advantageously guides the automated extraction of information about managed/custom code from the managed system 203. In some embodiments, the object structures comprise tables. It will be appreciated that the objects shown as included in the management structure 211 are illustrative. Different objects may be used instead for different managed systems and to achieve different managed code management goals.

TABLE 1

| Object ID | Description | Maintainable |
|---|---|---|
| Analysis Tool | Analysis tool | false |
| CustomCodeDuplicate | Duplicate of a custom code object | false |
| CustomCodeItem | Object item level (e.g. function module); a method that belongs to a class | false |
| CustomCodeObject | Custom Code object | false |
| Instance | Instance | false |
| Landscape | Landscape information | false |
| Owner | Owner of Custom Code object or item | true |
| Contract | Contract for Custom Code object | true |
| System | System information | false |

Various labels are used in this description and in the drawings to identify objects and information structures and computer program routines, for example. For instance, the labels ‘CustomCodeDuplicate’, ‘CustomCodeItem’ and ‘CustomCodeObject’ are used in Table 1, FIG. 3 and throughout the description and drawings. The prefix labels ‘SAP’ are used in Table 3. It will be appreciated that these labels are merely illustrative and for the purpose of distinguishing among different objects, structures and routines, and are not intended to limit the scope of protection to only the specific embodiments associated with such labels.

The column ‘Maintainable’ indicates whether a prescribed user, e.g. a customer, can create or change a value associated with the object.

The management information structure 211 includes a first CustomCodeObject object 308 (e.g. a program, class or database table) that corresponds to and identifies managed/custom code that runs on the managed system 203. The managed/custom code is referred to as ‘managed’ code since it is the code about which information is extracted from the managed system 203. The managed/custom code also is referred to as ‘custom’ because it may be code that is created for some special purpose (e.g. standard software do not fulfill the requirements) by an owner of the code who now wants to monitor its use so as to better manage the code throughout its lifecycle in the managed system 203. The managed/custom code may be object oriented code that has attributes. The extracted information pertains to attributes of the managed code. Accordingly, the first object 308 possesses, i.e. has relationships, with attributes of the custom code to which it corresponds.

The first CustomCodeObject 308 has a second Custom Code Duplicate object 310, which comprises a duplicate of the first object 308. The presence of the duplicate second object 308 allows for extraction of information about corresponding managed code for but for a different landscape, for example. Duplicate information also can be important, for example, if a customer wants to merge development systems. (Generally, development systems are independent.) Note that at several different development landscapes each developer can create the same program or database table or structure. If these objects are deployed in a productive system, only one object can win, because each object is identified by special attributes like name, type and so on and that is then a potential problem and must be identified. Providing a duplicate object 310 addresses this kind of an issue, for example.

The first CustomCodeObject object 308 and second Custom Code Duplicate object 310 both own third CustomCodeItem object 320. The third object 320 may act as a sub-object that includes methods of a class, for example.

The first CustomCodeObject object 308 and second Custom Code Duplicate object 310 both own fourth Owner object 304. The fourth object 304 may be used to identify what individual representatives of an organization are the owners or persons responsible for 308 and 310.

The first CustomCodeObject object 308 and second Custom Code Duplicate object 310 both own fifth Contract object 306. The fifth object 306 may correspond to and identify an organization such as a company that has contracted to the development of custom code objects (In an IT organization some application managers develop with their teams programs and other related staff and that is reported on contracts). In some embodiments the fourth Owner object 304 and the fifth Contract object 306 are created manually in order to maintain important information about responsibilities and contract information for 308 or 310. (Example: A company develops software for another company and there must be a contract and responsible person for each developed object; a contract can be also a maintenance contract and so on)

The first CustomCodeObject object 308 and second Custom Code Duplicate object 310 both own sixth AnalysisTool object 318 that identifies an analysis tool used to extract information from the managed system 200. The sixth AnalysisTool object 318 contains the name of an extractor tool and the Software Vendor as well as the version. This information can be used for technical assistance purposes, for example.

The first CustomCodeObject object 308 and second Custom Code Duplicate object 310 both own seventh System object 312. In some embodiments, a system is identified by System ID and installation number. The software which is running on such a system can be different, and therefore, it is important to have references between objects 308, 310 and 312. The seventh object 312 indicates the system where instances of the managed code run and where the extraction tool should look to find the managed code instance to extract information about it.

The seventh System object 312 owns an eighth Instance object 314 that identifies an instance of the System from which an extraction tool is to extract information. The System object 312 owns the Instance object 314, which maps to a particular processing system, i.e. to a managed system. In some embodiments, an Instance is a Netweaver instance in that special case, but generally it can be also any application server. There can be more than one kind of application server in a system. For example there may be a PC running Windows (Windows Instance) and also a Linux (Linux Instance). It is understood that some programs run on Windows, but not on Linux and vice versa, but other programs can run under both operating systems.

A ninth Landscape object 316 owns the seventh System object 312. A landscape is a set of systems with a development system, one or more test systems and productive systems, all these systems are organizes/maintained in a solution) The ninth Landscape object 316 identifies all systems which are assigned to a landscape. For example all systems for America assigned to Solution ‘America’; all systems with users in Europe are part of Solution ‘Europa’; and so on.

The detailed text shown within objects in FIG. 3 indicates the attributes assigned to the object. Furthermore the template library structure 211 can be changed. There can be only one active library instance managing custom code.

Figure 4:
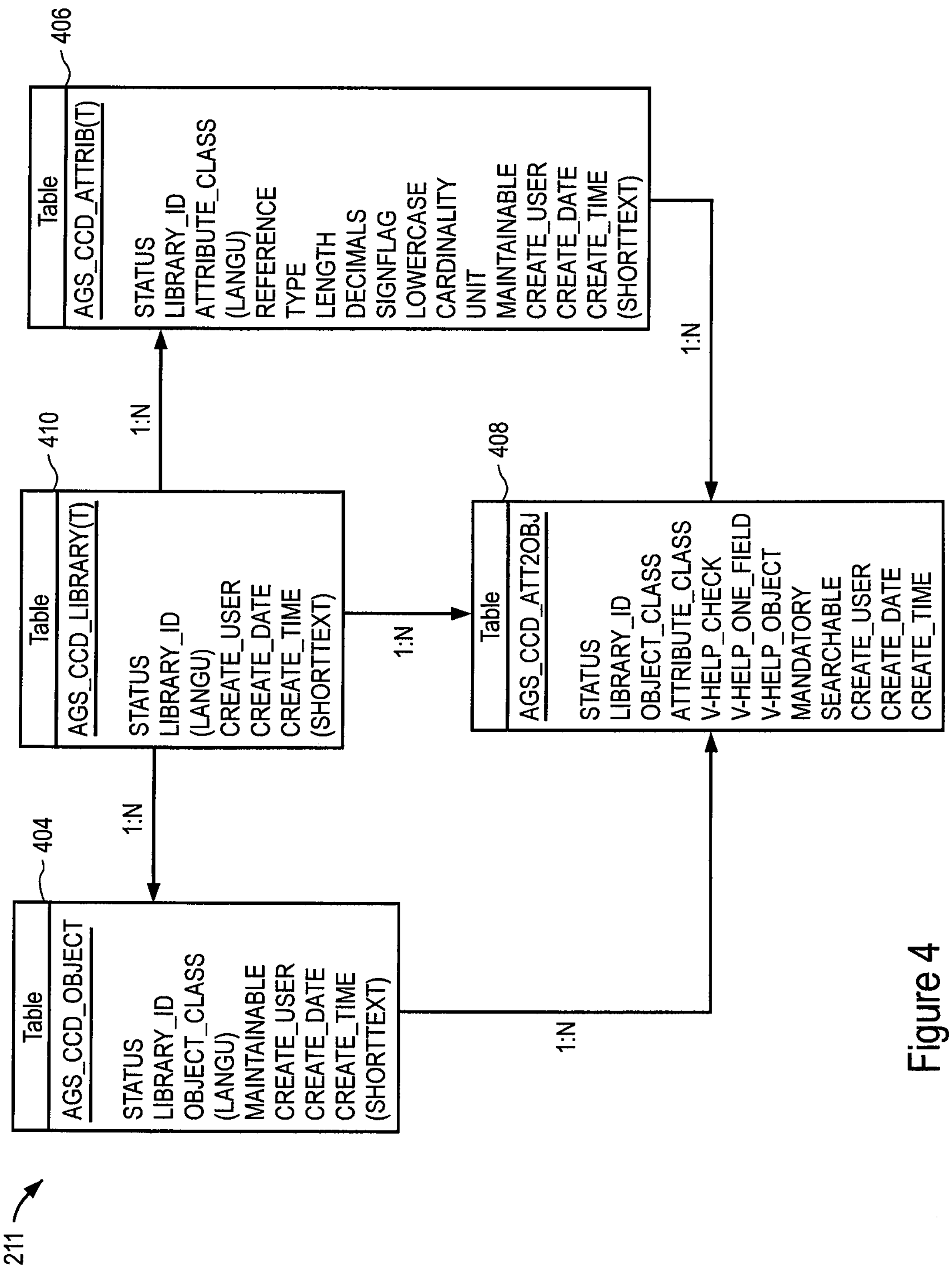
FIG. 4 is an illustrative drawing of a master object definition structure provides a master table structure where management information structures are stored in accordance with some embodiments.

FIG. 4 is an illustrative drawing of a master object definition structure provides a master table structure where management information structures 211 and 217 are stored. The information in Table 1 is stored in object 404. The role of the master object definition structure information structure 211 is explained in detail in commonly owned U.S. patent application Ser. No. 13/006,059 and will not be further explained herein.

The management information structure 211 (also referred to as a 'library template') is stored with a master library object CCD_LIBRARY 410, and all nine described objects (304, 306, 308, . . . 320) of the master information structure 211 are stored as master objects in CCD_OBJECTS 404; all master attributes are stored in CCD_ATTRIB 406; and the relations or mappings between objects and attributes are stored in CCD_ATT2OBJ 408.

The master library object 410 can have instances of the master object 404 and master attributes 406 as well as the relationship (mapping) table 408.

Each of the master library object 410, the master object 404, master attribute object 406 and master relations object 408 includes Status and Library_ID. The Status has only two values (Active or Inactive). If an object or attribute has status 'Inactive' it is ignored. The Library_ID identifies a library definition or strictly speaking, a library definition instance. The library ID is later important for the information structure illustrated in FIG. 6 where master data information 213 and custom code similarity results 219 are stored. The Status and the Library Identifier act as a master key for the other tables (404, 406, 408) and acts as the identifier of the Library (e.g., Library Name) of 202 of FIG. 2. The information structure of FIG. 4 contains the table design where the library definition 211 is saved. The OBJECT_CLASS in 404 is the identifier for the nine objects (CustomCodeObject, Custom CodeItem, . . . ) and the attribute class is the identifier of attributes like Object, Object Name, Author, CRelease, as illustrated in FIG. 3. The cardinality column attribute object 406 is used to set the occurrence for an attribute (e.g. "N" means that the attribute can occur n times, "1" means only once). The other attribute entries in attribute object 406 are self-explanatory. Each of the master object 404, master attribute object 406 and master relations object 408 identifies the objects of the information structure 211 shown in FIG. 3 that are saved in database tables.

Figure 5:
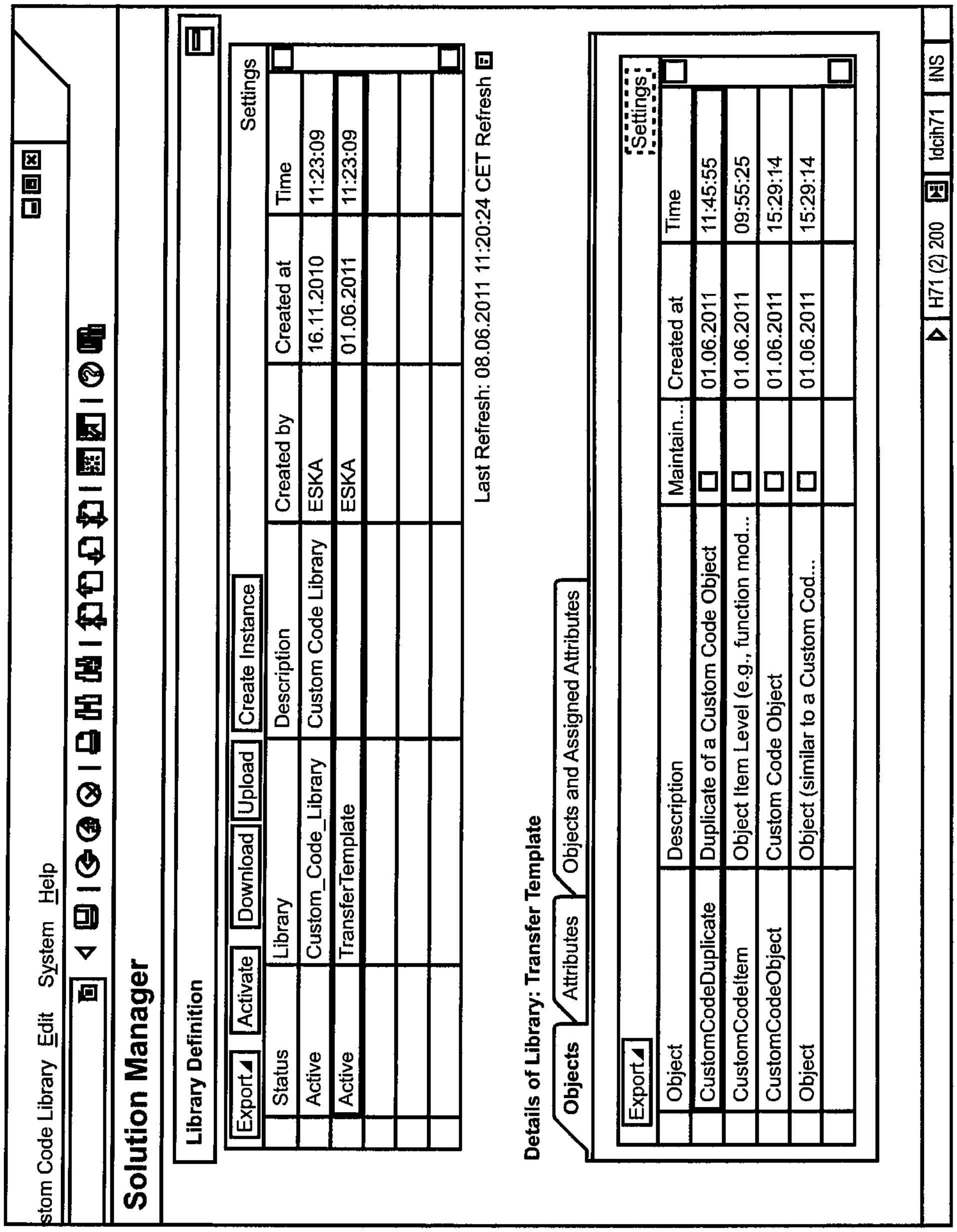
FIG. 5 is an illustrative drawing of a user interface screen display screen in which a user can define and activate a transfer information structure definition.

FIG. 5 is an illustrative drawing of a user interface screen display screen in which a user can define and activate a transfer information structure definition 217. The transfer information structure definition 217 is modeled after the master data information structure definition 211, but includes only three of the objects from that structure and contains additional attribute information for exchange between the managed system 202 and the provider system 250. The example screen display shows that a "TransferTemplate" is defined as including only a "CustomCodeObject", a "CustomCodeDuplicate" and a "CustomCodeItem". Each of these three objects is described above with reference to FIGS. 3-4. Other portions of the master object definition information structure 211 that are omitted from the transfer information structure definition 217 may contain confidential customer information such as information about owners and contracts and other manual maintained information. The last object of the example screen display shows the Object. That is later important for the central instance or central provider instance where information from the provider is provided for data transfer to the managing system 200. That is described in detail with FIG. 13.

Figure 6:
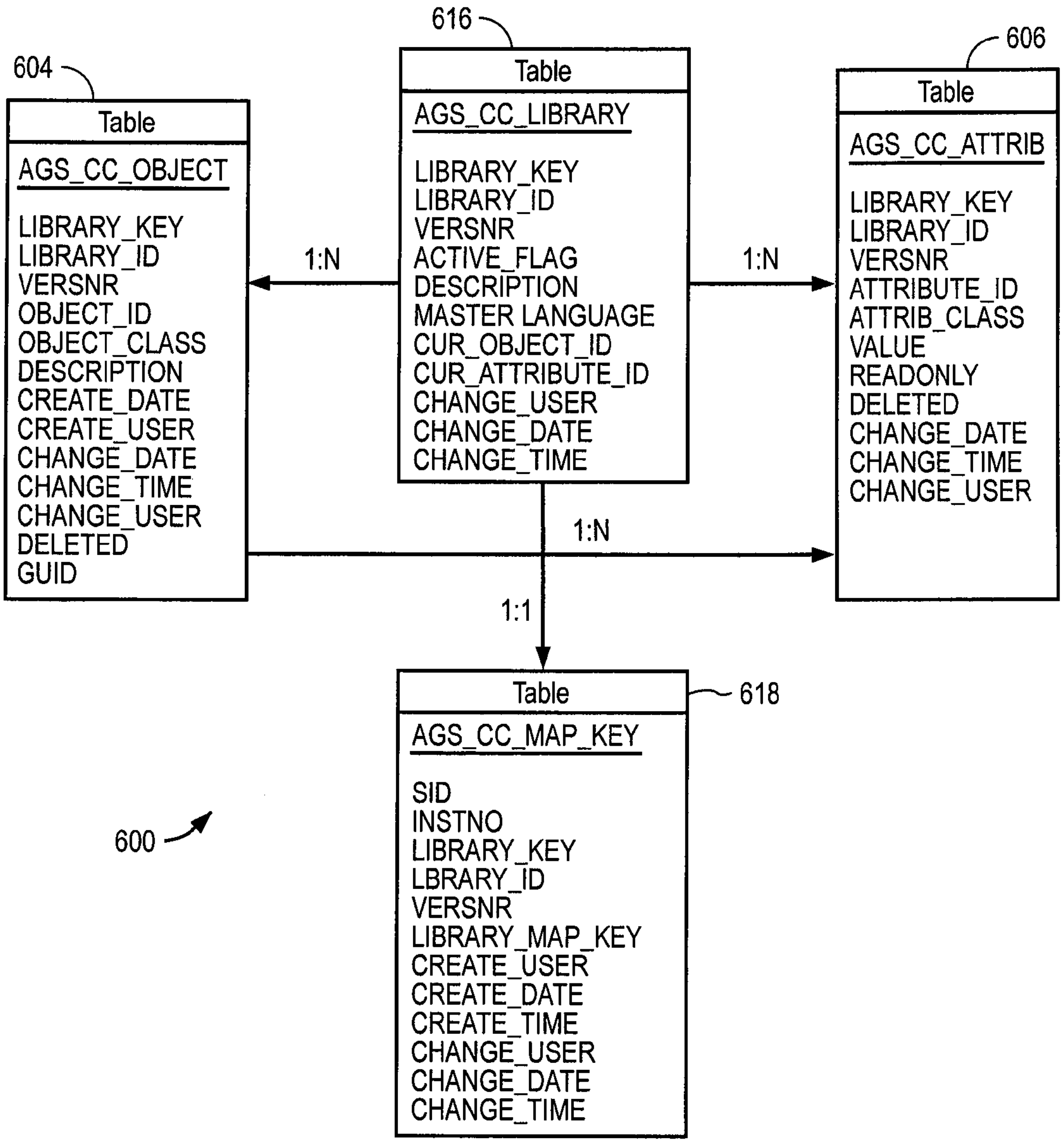
FIG. 6 is an illustrative drawing of a transfer instance data structure in accordance with some embodiments.

FIG. 6 is an illustrative drawing of a transfer instance data structure 600 used to transfer similarity attribute information extracted from the managed system 203 to the provider system 250 and to transfer analysis results from the provider system 250 to the managed system 203. The instance information structure 600 is stored in a computer readable storage device. Objects within the structure 600 are implemented as tables (FIG. 6) in some embodiments.

In this description, CCD (Custom Code Definition) objects in FIG. 4 contain the definitions, and CC (Custom Code) objects in FIG. 6 contain the values, the content of which are provided by the extractor that extracts information from the managed system 203 or analysis tools operated by the provider system 250. In the illustrative instance information structures 213 a library CC_Library object 616 owns a data object CC_Object 604 and data attribute CC_ATTRIB 606. FIG. 6 shows the relationships between the database tables for one entry. One instance which is identified by library key, library ID and version has many objects (CustomCode Objects)—therefore 1:N relationship, and each CustomCodeObject has many attributes—therefore 1:N relationship). Simplified, the collected objects and attributes from 207 and 228 are stored in transfer instance data structure 600.

Each of the objects in the instance information structure 213 and 219 contains Library_Key information, Library_ID information and Versnr information. A unique key is necessary to identify objects and their relations on database level. The library object 410 of FIG. 4 contains the value (identifier) for the Library ID, this Library ID together with Library Key and version (Versnr) define a Library instance for data. The transfer structure is now a combination of data from the library instance information structure 213 and similarity results instance information structure 219.

The data attributes 606 includes an Attribute_ID. The Attribute ID is unique and is used to store all information related to that attribute. A data object 604 can have many attributes (see definition in FIG. 3), and each attribute has a unique attribute identifier (Attribute_ID).

The library instances at the software provider 250 and the managing systems 200 which have a connection the software provider 200 needs to be mapped and identified. That is realized with map table 618. 618 will be filled only at the software provider 250.

The example screen display shows two additional categories of attribute information: similarity attribute information and provider results attribute information.

Similarity attribute information includes "SimilarityResult" attribute information and the "SimilarityDegree" attribute information, which are explained in the following Table 2.

The similarity analysis provides a similarity degree that indicates the similarity of custom code objects. Based on the calculated percentages the custom code objects are identical, very similar, similar or partly similar to an object of the software provider. The calculated percentages provides by the tools are based on fingerprints. The implementation of the custom code objects separated into different parts. On these parts the fingerprints algorithm is executed and compared with the remaining custom code objects that have received a fingerprint themselves. The similarity analysis is a program that helps to identify duplicate code and similar programs.

TABLE 2

| Similarity Attribute | Description |
|---|---|
| SimilarityResult | identifies managed code identified as similar to some provided code |

TABLE 2-continued

| Similarity Attribute | Description |
|---|---|
| SimilarityDegree | provides a measure (e.g. a percentage) of similarity between the identified managed code and the provided code |

Provider results attribute information is explained in the following Table 3.

TABLE 3

| Provider Results Attribute | Description |
|---|---|
| Release | product release where new or enhanced features available |
| Recommendation | Recommendation |
| Object | related Object (result of similarity analysis) |
| Component | Software component of the object (e.g. SAP_CRM, SAP_BW, . . . ) |
| Documentation | Link to Service Marketplace for documentation |
| Notes | Notes details, e.g., priority, category, etc. |

FIG. 7 is an illustrative drawing of an example user interface screen display screen in which a user of the managing system 200 can designate a managed system from which to collect similarity information. In the example, a managed system identified as system 'H71' is selected, and custom code collector 207/226 is scheduled to run on a weekly basis. The collector 226 is running on the managed system 203 and the collector 207 is calling the collector 226 and is formatting, preparing and analyzing the data for saving in the custom code library. In response to this scheduling, for example, a custom code collector module 226 that runs on the managed system 203 identifies custom code objects running on the managed system 203. A CloneFinder module 225 that runs on the managed system 203 performs a similarity analysis in which SimilarityResults attribute information and SimilarityDegree attribute information is determined for custom/managed objects running on the managed system 203. In some embodiments, the CloneFinder 225 determines this attribute information by comparing similarity of code lines and code patterns of respective managed objects and provider objects. A custom code collector module 207 that runs on the managing system 200 calls (depending on data collection controller 240) the collector 226 and is formatting, preparing and consuming the data from 226. A similarity analysis collector 228 that runs on the managing system 200 calls the collector 225 in order to get the similarity and other results which needs to be prepared to store in the custom code library. A data collection controller 240 that runs on the managing system 200 organizes at which time, at which sequence and how often the collectors run. An instance data structure 600 (213, 219) is filled with extraction data from the collectors 207, 228 and 232 for managed objects that have at least a threshold level of similarity (e.g., 80%) with an identified provider object.

Figure 8:
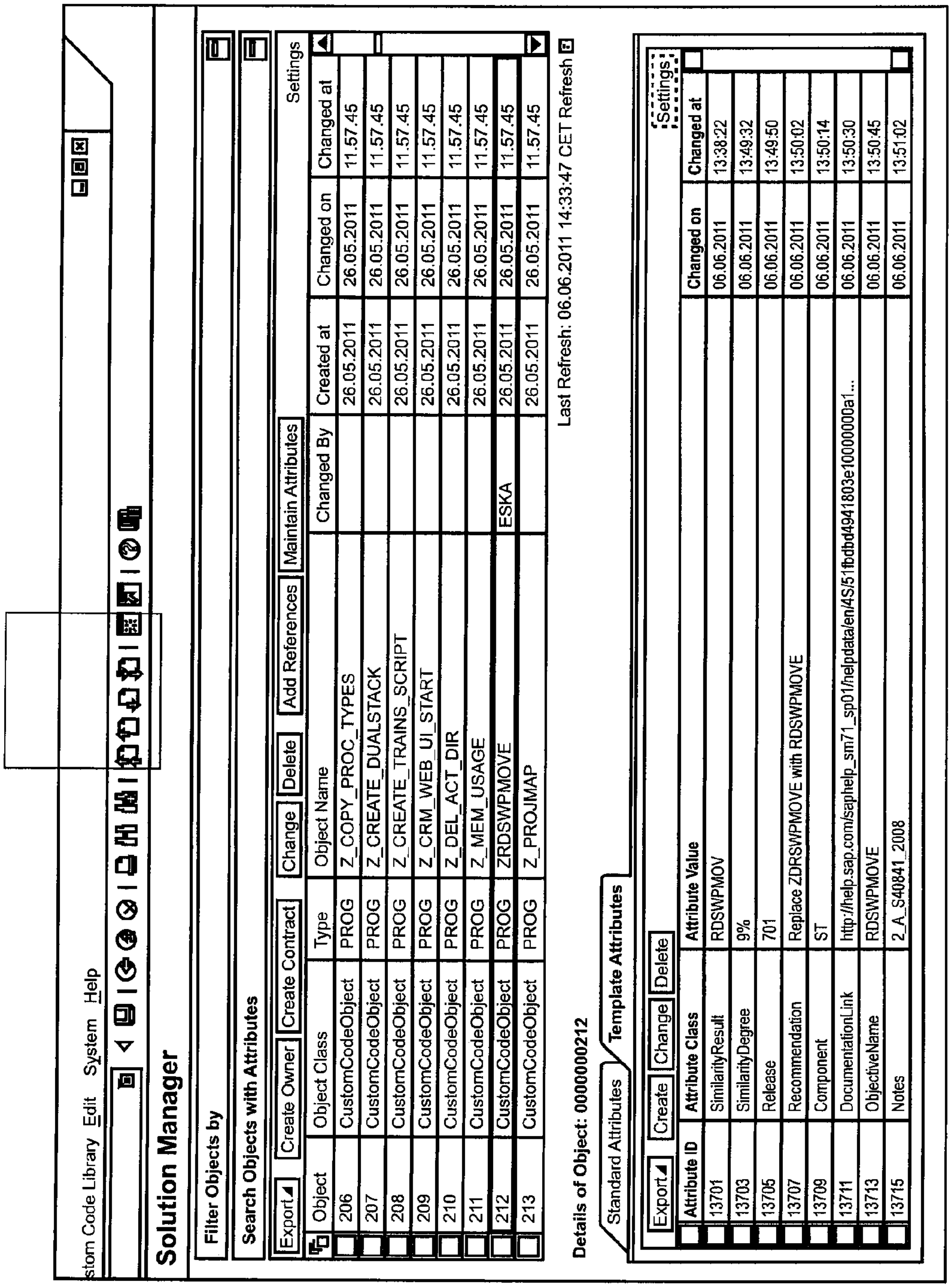
FIG. 8 is illustrative drawings of an example user interface screen display screen in which a user can observe attribute information generated for an instance data structure in accordance with some embodiments.

FIG. 8 is an illustrative drawing of an example user interface screen display screen in which a user can observe attribute information generated for an instance data structure. The screen display of FIG. 8 indicates that the transfer instance structure 600 for example CustomCodeObject "ZRDSWPMOVE" running in the managed system 203 has been determined to be similar to provider code object "RDSWPMOVE". Moreover the screen display indicates that a Similarity Degree has been determined to be 98%. In addition, the screen display identifies provider (e.g., SAP, AG.) results, further discussed below, that generated by the provider system 250 that collectively provide information about provider code objects that can be used in place of or to supplement or to modify the example CustomCodeObject.

Figure 9:
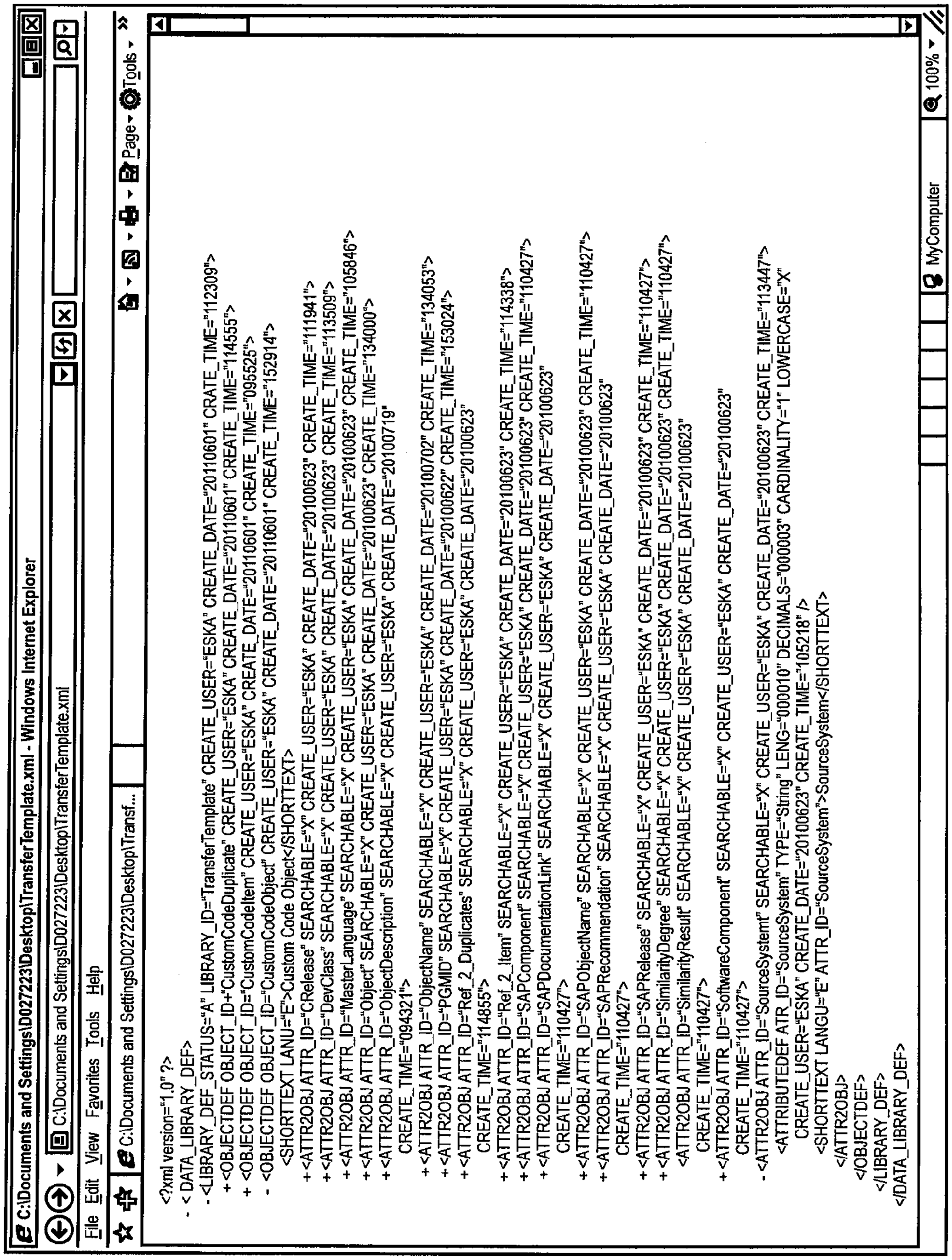
FIG. 9 is an illustrative drawing showing a representative portion of the transfer template XML structure used to transfer information within a transfer instance structure between the managed system and the provider system in accordance with some embodiments.

FIG. 9 is an illustrative drawing showing a representative portion of an illustrative transfer template definition XML structure 217 used to transfer information within a transfer instance structure 600 between the managing system 200 and the provider system 250. All exchanged data are defined in that transfer template definition structure 217 and approved by the managing system 200. More particularly, the data transfer collector module 230 that runs on the managing system 200 loads information from a transfer instance structure 600 to a transfer template XML for transfer to the provider system 250. The data collector controller 240 schedules and controls the data transfer via the postbox 252 in FIG. 11. (The data exchange is between managing system 200 and provider system 250)

Conversely, when the managing system 200 receives a transfer template XML from the provider system 250, data transfer collector 232 that runs on the managing system 200 loads information from the transfer template XML in order to extract and to save the data in the transfer instance structure 600 (The information from the provider is not directly for use by the managed system 203. The information is used to decide that the custom code object can be replaced by the provider object. There is no automatic replacement of custom code objects in some embodiments, for example.). The data collector controller 240 schedules and controls the data response process via the postbox 252 in FIG. 11.

Figure 10:
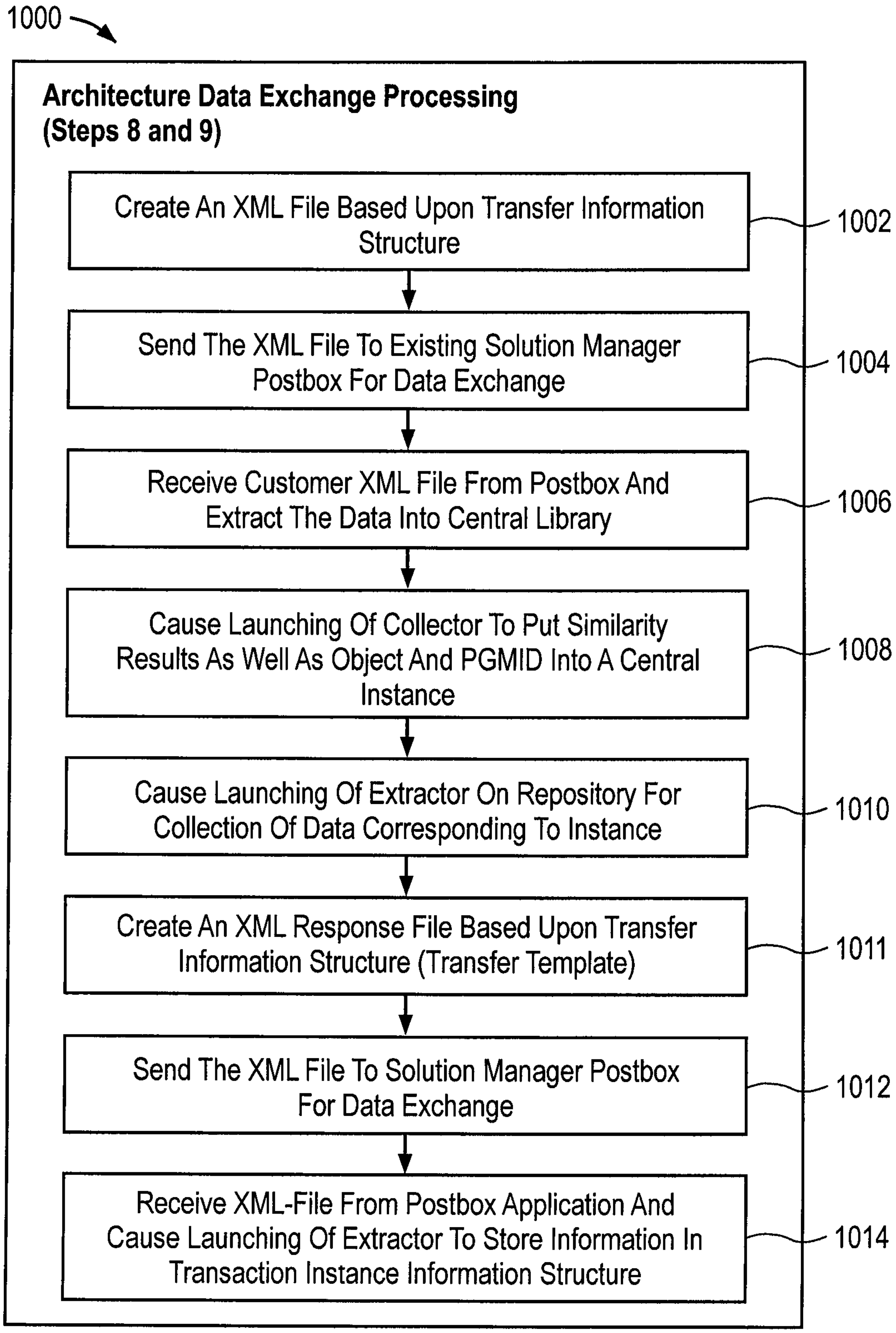
FIG. 10 is an illustrative flow diagram of an overall process to use transfer similarity and results attribute information between the managing system and the provider system in accordance with some embodiments.

FIG. 10 is an illustrative flow diagram of an overall process 1000 to use transfer similarity and results attribute information between the managing system 200 and the provider system 250 in accordance with some embodiments. In step 1002 that runs on the managing system 200 creates a file containing a transfer template XML structure (the 'XML file') using module, 230. The data are stored in structure 600 and which data are collected depend on transfer template definition 217, which contains similarity attribute information. In step 1004 the XML file is sent to the postbox system 252 for exchange with the provider system 250. The postbox system forms no part of the invention and will be readily understood by persons skilled in the art and will not be further described herein. In step 1006, the provider system 250 extracts data from the XML file from the postbox system 252 and loads the extracted data into an instance structure 600 (described already in FIG. 6) accessed by the provider system 250. The map table structure 618 is necessary for the provider system 250 where the incoming data will be mapped. In step 1008, the provider system 250 launches an extractor 1106 (see also FIG. 11) to use the similarity information from the XML file data to collect results information and the PGMID, OBJECT and OBJECTNAME—each of these three attributes is the unique key of an object from an information repository. The gathered results information relates to a provider object identified in the XML file and that the XML file indicates to be similar to a custom/managed object identified in the XML file. In step 1010, the provider system 250 launches an extractor 1110 in FIG. 11, to collect results data corresponding to the provider object in identified as similar to a custom code object. In step 1011, response information is loaded to an XML response file. In step 1012, the system sends the XML file with the gathered results information to the postbox system 252. In step 1014, the managing system 200 causes an extractor to extract information from the returned XML file and to load it into an instance structure 600.

Figure 11:
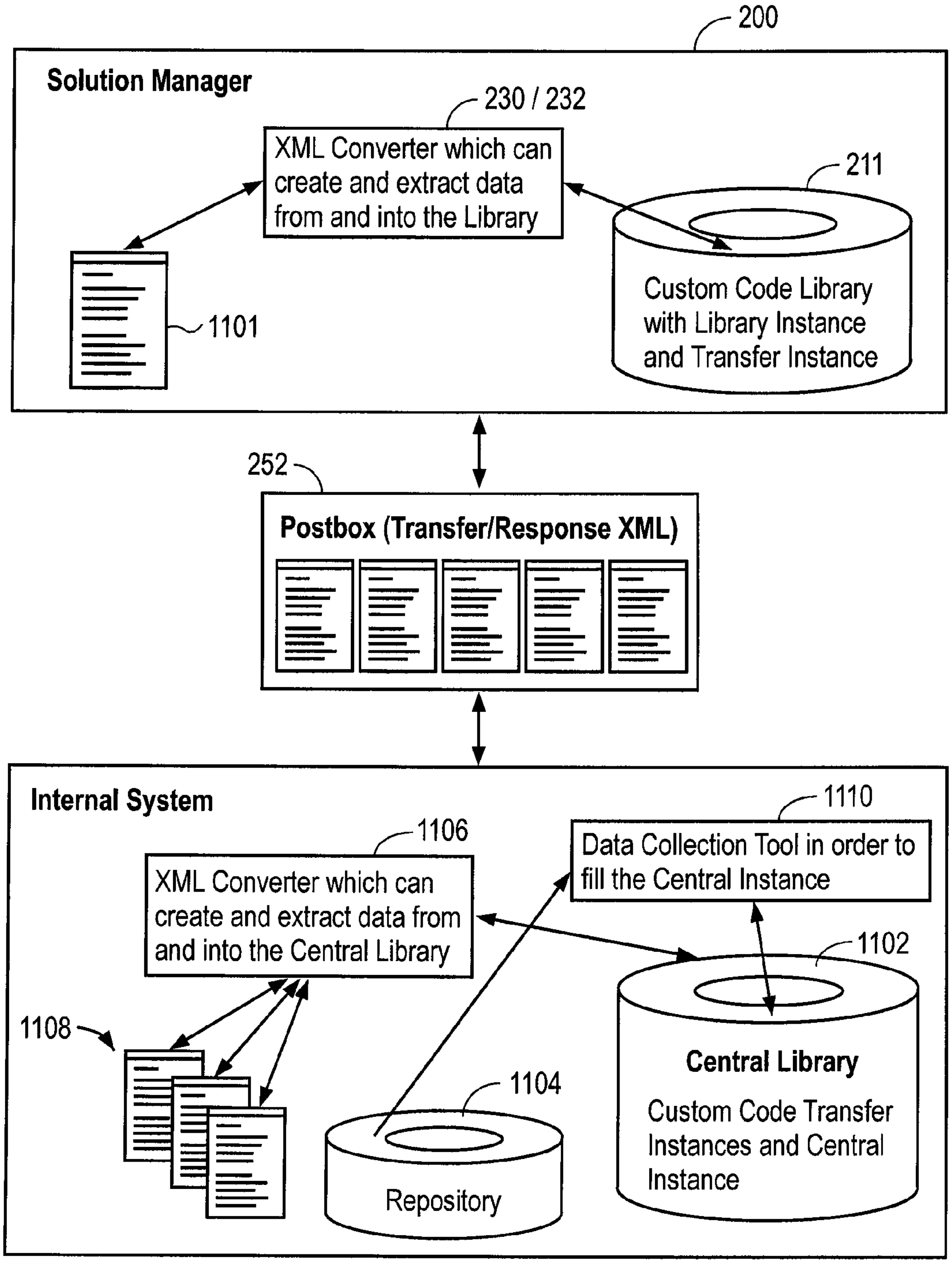
FIG. 11 is an illustrative block diagram showing in conceptual terms components involved with transfer of information between the managing system 200 and the provider system in accordance with some embodiments.

FIG. 11 is an illustrative block diagram showing in conceptual terms components involved with transfer of information between the managing system 200 and the provider system 250. An XML converter 230/232 converts information between an XML file 1101 and a transfer instance data structure. A central library 1102 with several instances of instance structure 600. Each library instance 213 is identified by Library Key, Library ID and version and can be mapped (618) depending on the identified managing system 200 (managing system is identified by SID and Instno). A repository 1104 contains the information from the software provider system 250 concerning original software and maintenance, new developments and updates of the original objects. The central library 1102 contains transfer instances received from multiple managing systems 200 and a single central provider instance created from data of the repository 1104. An analysis tool module 1106 extracts data from XML files 1108 sent by the managing system 200 and loads the data into the central library 1102. A collection tool 1110 scans the repository 1104 to locate information to load to the central instance object. The postbox system 252 is used to transfer XML files between the managing system 200 and the provider system 250.

Figure 13:
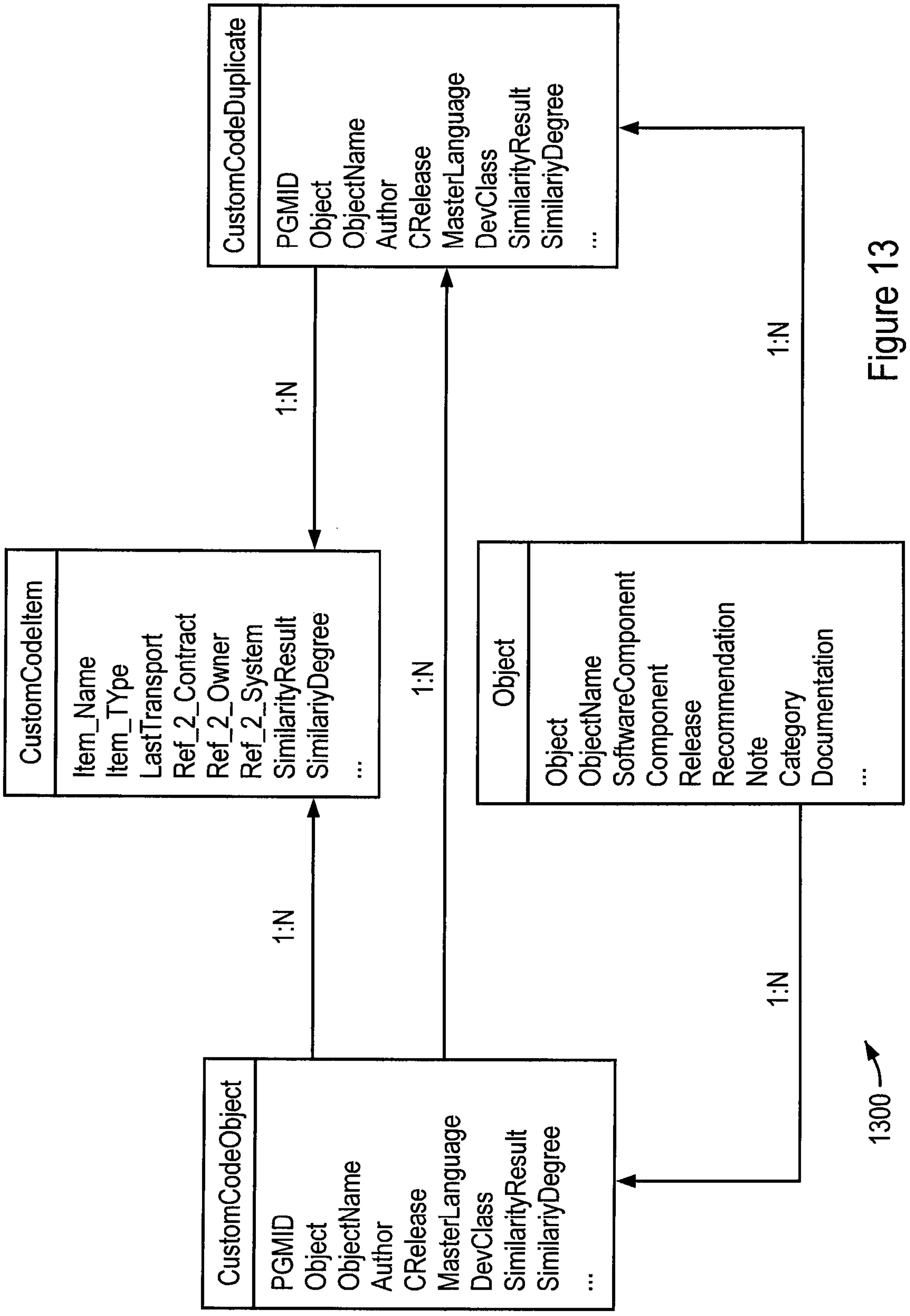
FIG. 13 is an illustrative drawing of a central provider instance information structure according to some embodiments.

FIG. 13 is an illustrative drawing of a central provider management information structure, which is also stored in the same instance information structure 600 according to some embodiments. The central provider instance structure is similar to the structure of the transfer instance 213 of FIG. 6 except that the central provider instance structure includes only one object class (Object). Furthermore, the attributes of the CustomCodeObjects are reduced depending on the Transfer Template Definition 217. The Library Key for that central instance is ‘provider name’ and the Library Identifier is ‘Objects’. The central provider instance structure exist together with the received instance information structures 600 and stores information concerning all custom/managed objects determined to be similar to provider objects information. The central instance structure includes a mapping 618 to handle the different customer library instances 600 sent via the postbox 252. 618 will be filled by the software provider only and is not used in the managing systems 200. The table is necessary because different managing systems 200 can have the same library key. In some embodiments, that table (AGS_CC_MAP_KEY) includes the fields shown in Table 4

TABLE 4

| Mapping Field | Explanation |
|---|---|
| Customer number (optional) | Customer Identifier (optional) |
| LIBRARY ID | Library Identifier |
| LIBRARY KEY | Generated Key at software provider, because some managing systems 200 can have the same key |
| VERSNR | Version - default ‘00001’ |
| LIBRARY_MAP_KEY | Library Key from 600 of managing system 200 |
| SID (e.g., Solution Manager SID) | System Identifier for managing system 200 |
| INSTNO (e.g., Solution Manager Installation Number) | Installation number which identifies managing system 200 |

After extraction of XML files into the custom code transfer instance which is part of 1102, an analysis is running and adding results information from the repository 1104 into a central library instance which is also part of 1102. The analysis tool 1106 runs on the provider system 250 and scans all library instances sent from customers to the provider system 250 and identifies results information provided within the repository 1104 that indicates new functions and enhancements to provided code objects that are similar to custom code objects. For example, 150 managing systems 200 might send data via the postbox 252 to the provider system 250. Hence 151 instances are in the central library 1102, because the 150 instances with CustomCodeObjects and one instance with Objects.

For example, referring again to the screen display of FIG. 8, the attribute information indicates that a customer has developed its own CustomCodeObject (ZRDSWPMOVE) to move data from one Solution Manager to another one perhaps, because not all data are considered with the provided code object/program (RDSWPMOVE) made available by the provider system 250. However, assume that recently, the provider object (RDSWPMOVE) has been improved, and that update information has been developed that relates to the provider object. However, the customer has no idea at which release or at which support package update information became available. The provider system 250 determines which update information to send to the managed system 203 as results information to inform a user of the managed system 203 of the update information pertinent to the provider object determined to be similar to the managed object. In some embodiments, the update information provides an explanation of the provider code object that is useful to a user of the managed system 203 to decide whether to adopt the provider code object in place of the managed code object, for example. The provided code object/program RDSWPMOVE is identified in the SimilarityResult field (13701) of the screen. A similarity of 98% is identified in the SimilarityDegree field (13703) of the screen. Fields 13705-13715 provide results information indicating information about the provided object RDSWPMOVE that is relevant to the managed object ZRDSWPMOVE determined to be similar.

One of the results information field (13715) identifies notes with a special format (e.g. <Priority> ‘_’ <Category> ‘_’ <Note number> ‘_’ <Year>. The following are examples of notes information:

Note Number
Short Text
Status (only released notes are taken into account)
Component (SV-SMG-OP)
Priority (1 . . . 6)
- 1 HotNews
- 2 Correction with high priority
- 3 Correction with medium priority
- 4 Correction with low priority
- 6 Recommendations/additional info Category
- A Program error
- B Consulting
- C Customizing
- D Advance development
- E Special development
- F Documentation error
- G Translation error
- H Legal change
- I Installation information
- K FAQ
- M Modification
- N Exit added
- O Announcement of Legal Change
- P Performance
- R Release planning information
- T Correction of Legal Function
- U Upgrade information
- W Workaround for missing functionality X External error Y Help for error analysis Validity (Table with Software Component, Release from, Release to)

Correction Instruction (Type of Instruction, . . . )

Support Packages

The identified central library instance object (Object in FIG. 13) is saved only once into the central library 1102 in order to reduce the number of objects in the library. The identified instance object is similar to the Custom Code Library Instance. Furthermore it is expected that several customers have the same reference to a provider code object and hence response information can be calculated easier using a single instance object. That instance object contains provider system objects and their information.

By way of further explanation, note that the object RDSWPMOVE exists only once at the provider system 250, but many different customers, perhaps 10,000 different customers, have objects with names such as YDSWPMOVE, Z_RDSWPMOVE, ZYMOVE, Z_TESTMOVE, for example, and some other objects which are similar to the provider object on different provider releases and with different similarity degree. The provider system saves out information only once and depending on the customer the provider system sends to the customer the necessary information depending on his release for example.

Thus, response information is for the XML file is calculated based upon the customer transfer instance data structure 600 and the central library instance object. The calculation is running on the CustomCodeObjects in the central library 1102 and for the identified provider objects (Object) all necessary information from the central instance is collected and added to the CustomCodeObject and added to the response information structure (XML).

Figure 12:
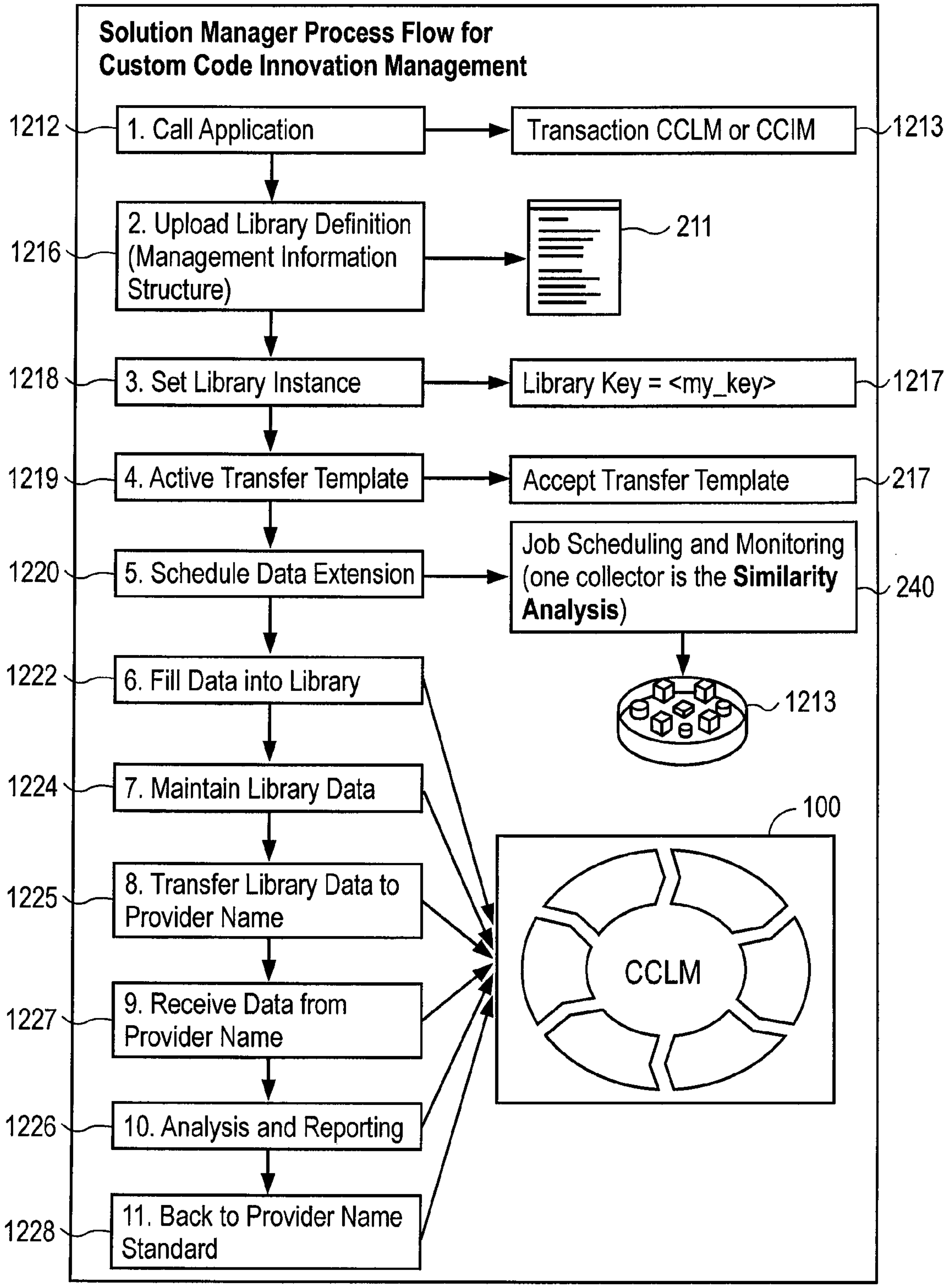
FIG. 12 is an illustrative flow diagram representing an overall flow in accordance with some embodiments.

FIG. 12 is an illustrative flow diagram representing an overall flow in accordance with some embodiments. Block 1212 represents the act of calling transaction program code to start a Custom Code Lifecycle Management (CCLM) or Custom Code Innovation Management (CCIM) program represented by block 1213. A user may periodically call the transaction program 1213 to set code extraction requirements or modify the library structure. Block 1216 represents the act of uploading an XML library definition file describe in co-pending application Ser. No. 13/006,059. Structure and content of the file, in some embodiments, is represented by the management information structure 211 of FIG. 3. Block 1218 represents the act of creating a library instance having a library key 1217. The key is important for master data information structures 213 and transfer instance information structure 217. Block 1219 represents the act of activating a transfer template structure 217. Block 1220 represents the act of scheduling data extraction. For example, a user may create a structure to indicate times job scheduling similarity analysis job 1221 to be applied to a landscape 1213 designated in the management information structure 211. Block 1222 represents the act of filling data into a transfer instance 600.

Operation of the illustrative custom code innovation management process 100 of FIG. 1 occurs through acts represented by blocks 1222-1228. The act represented by block 1222 begins with filling extracted similarity data to the instance structure 600 of FIG. 6. The act of block 1222 may occur periodically depending upon job scheduling and monitoring of block 240. Block 1224 represents the act whereby customers can maintain Custom Code Objects. Block 1225 represents transfer of similarity attribute information from the managing system 200 to the provider 250. Block 1227 represents transfer of results attribute information from the provider 250 to the managing system 200. Block 1226 represents a manual user initiated act whereby a user can check reports. Block 1228 represents decision assistance depending on the results and the data in the library. If a custom code objects is for instance 100% identical to an original objects of the software provider it can be deleted.

Hardware Embodiment

Figure 14:
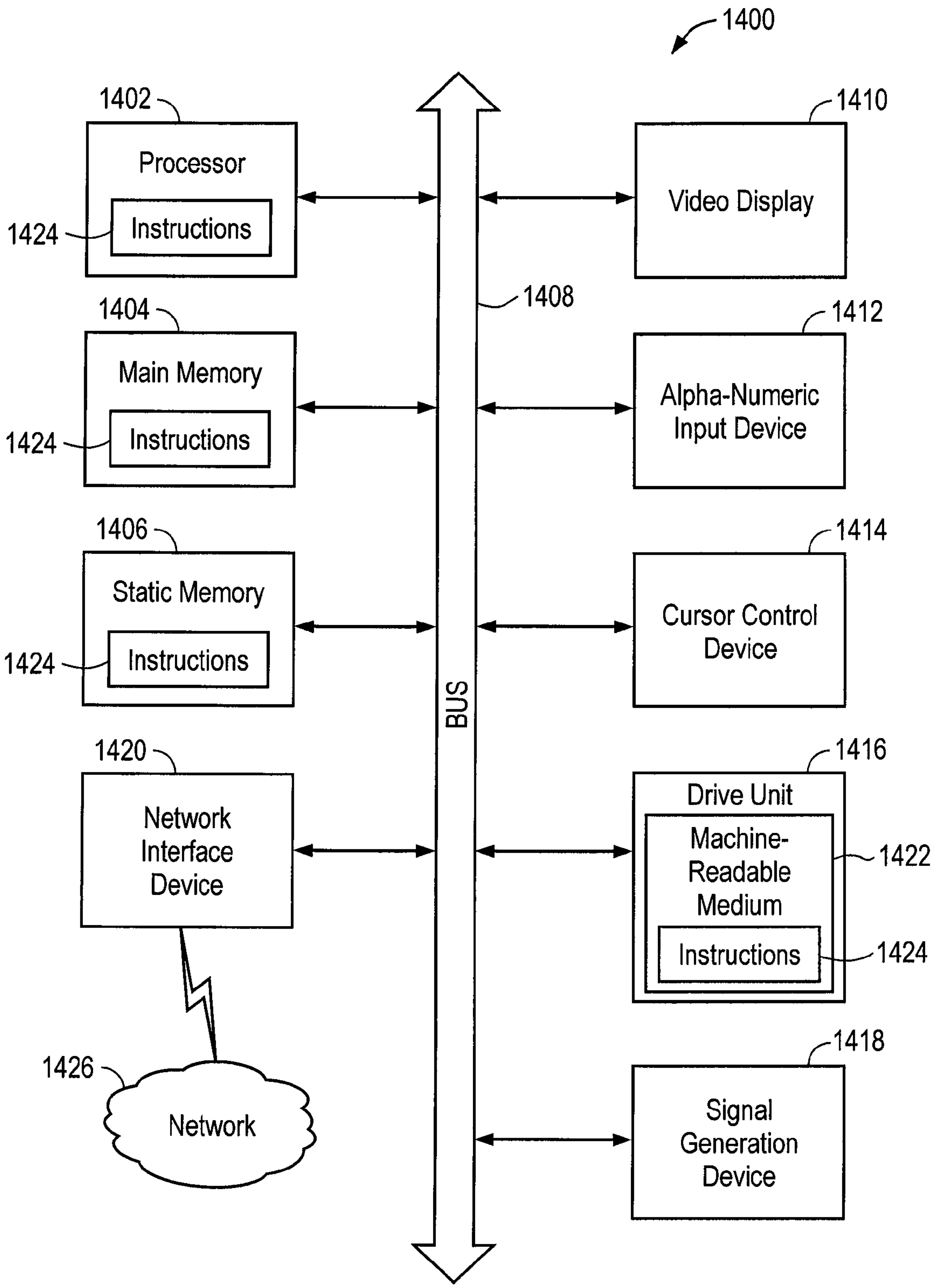
FIG. 14 is a block diagram of a computer processing system within which a set of instructions, for causing the computer to perform any one or more of the methodologies discussed herein, may be executed in accordance with some embodiments.

FIG. 14 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1400 includes processor 1422 (e.g., a central processing unit (CPU), a graphics processing unit (GPU) or both), main memory 1404 and static memory 1406, which communicate with each other via bus 1408. The processing system 1400 may further include video display unit 1420 (e.g., a plasma display, a liquid crystal display (LCD) or a cathode ray tube (CRT)). The processing system 1400 also includes alphanumeric input device 1422 (e.g., a keyboard), a user interface (UI) navigation device 1414 (e.g., a mouse, touch screen, or the like), a disk drive unit 1416, a signal generation device 1418 (e.g., a speaker), and a network interface device 1420.

The disk drive unit 1426 includes computer-readable storage device 1422 on which is stored one or more sets of instructions and data structures (e.g., software 1424) embodying or utilized by any one or more of the methodologies or functions described herein. The software 1424 may also reside, completely or at least partially, within a computer readable storage device such as the main memory 1404 and/or within the processor 1422 during execution thereof by the processing system 1400, the main memory 1404 and the processor 1422 also constituting computer-readable, tangible media.

The software 1424 may further be transmitted or received over network 1426 via a network interface device 1420 utilizing any one of a number of well-known transfer protocols (e.g., HTTP).

While the computer-readable storage device 1222 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The invention claimed is:

1. A method to manage program code that runs in a computer system comprising:

producing a transfer template information definition structure in a computer readable storage device that includes a management information structure that identifies a managed system and that identifies respective managed code objects that run on the managed system and that includes a provider code attribute to identify provider code objects that correspond to respective managed code objects and that includes a similarity measure attribute to provide indications of similarity between the respective managed code objects and corresponding provider code objects and that includes at least one results attribute to indicate respective results for respective managed code objects;

receiving from the managed system, a correspondence between a respective managed code object that runs on the managed system and a provider code object, wherein the correspondence is identified by the managed system;

receiving from the managed system, a determination of a measure of similarity between the identified managed code object and the corresponding provider code object, wherein the determination is made by the managed system;

producing a transfer instance of the transfer template information definition structure that includes transfer instance data that associates the provider code object identified, in the received identification, as corresponding to the respective managed code object with the provider object code attribute and that associates the measure of similarity, in the received determination, with the similarity measure attribute;

creating a first transfer file that includes the transfer instance data;

transferring the first transfer file to a provider system;

receiving from the provider system a second transfer file that includes results information associated with the at least one results attribute; and storing the received at least one results attribute information in the produced transfer instance of the transfer template information definition structure.

2. The method of claim 1, wherein the transfer instance includes a map structure to identify the managing system and to identify the provider system.

3. The method of claim 1, wherein creating a first transfer file includes encoding information using a markup language; and wherein receiving from the provider system a second transfer file includes receiving information encoded using the markup language.

4. The method of claim 1, wherein the transfer instance includes a map structure to identify the managing system and to identify the provider system;

wherein creating a first transfer file includes encoding information using a markup language and using the map structure to identify the provider system;

wherein receiving from the provider system a second transfer file includes receiving information encoded using the markup language and using the map structure to identify the managing system.

5. The method of claim 1, wherein identifying a correspondence includes receiving, from the managed system, identification of the correspondence between the respective managed code object that runs on the managed system and the provider code object.

6. The method of claim 1, wherein determining a measure of similarity includes determining similarity of a name of the identified managed code object and a name of the corresponding provider code object.

7. The method of claim 1, wherein determining a measure of similarity includes determining similarity of code of the identified managed code object and code of the corresponding provider code object.

8. The method of claim 1, wherein the results information includes information to explain the provider object to a user of the managed system.

9. The method of claim 1, wherein the results information includes providing a recommendation to replace the managed code object with the corresponding provider object.

10. The method of claim 1, wherein the results information includes providing access to documentation concerning the corresponding provider object.

11. A method to manage program code that runs in a computer system comprising:

producing a transfer template information definition structure in a computer readable storage device that include management information structures that identifies multiple different respective managed systems and that identifies respective managed code object that runs on the different respective managed systems and that include a provider code attribute to identify provider code objects that correspond to respective managed code objects and that include a similarity measure attribute to provide indications of similarity between the respective managed code objects and corresponding provider code objects and that include at least one results attribute to indicate respective results for respective managed code objects;

for each of the at least two of the multiple managing systems, receiving from the managed system, a respective identification of a correspondence between a respective managed code object that runs on a respective managed system and a provider code object, wherein the correspondence is identified by the managed system;

for each of the at least two of the multiple managing systems, receiving from the managed system, a respective determination of a measure of similarity between the identified managed code object and the corresponding provider code object, wherein the respective determination is made by the managed system;

for each of the at least two of the multiple managing systems, producing a respective transfer instance of the transfer template information definition structure that includes respective transfer instance data that associates the provider code object identified, in the received respective identification, as corresponding to the respective managed code object with the provider object code attribute and that associates the measure of similarity, in the received respective determination, with the similarity measure attribute;

for each of the at least two of the multiple managing systems, creating a respective first transfer file that includes the respective transfer instance data:

for each of the at least two of the multiple managing systems, transferring the respective first transfer files to a provider;

for each of the at least two of the multiple managing systems, receiving from the provider system respective second transfer files that include respective results information associated with the at least one results attribute; and for each of the at least two of the multiple managing systems, storing the received at least one results attribute information in the respective produced transfer instance of the transfer template information definition structure.

12. The method of claim 11, wherein associating respective results information includes associating different respective results information with different respective transfer instances.

13. The method of claim 11, wherein respective transfer instances include respective a map structures to identify managing systems and to identify the provider system.

14. The method of claim 11, wherein the respective first transfer files include respective map structures to identify respective managing systems and to identify the provider system;

wherein creating the respective transfer files includes encoding respective information using a markup language and using the respective map structures to identify the provider system;

wherein receiving from the provider system respective second transfer files includes receiving information encoded using the markup language and using the respective map structures to identify the respective managing systems.

15. An article of manufacture that includes a non-transitory computer readable storage device that stores program code in one or more information structures, wherein the computer program code configures a managing computer system to perform a method comprising:

providing a transfer template information definition structure in a computer readable storage device associated with the managing system that includes a management information structure that identifies a managed system and that identifies respective managed code objects that run on the managed system and that includes a provider code attribute to identify provider code objects that correspond to respective managed code objects and that includes a similarity measure attribute to provide indications of similarity between the respective managed code objects and corresponding provider code objects and that includes at least one results attribute to indicate respective results for respective managed code objects;

receiving from the managed system, identification of a correspondence between a respective managed code object that runs on the managed system and a provider code object, wherein the correspondence is identified by the managed system;

receiving from the managed system, a determination of a measure of similarity between the identified managed code object and the corresponding provider code object, wherein the determination is made by the managed system;

producing a transfer instance of the transfer template information definition structure that includes transfer instance data that associates a provider code object identified, in the received identification, as corresponding to a respective managed code object with the provider object code attribute and that associates the measure of similarity, in the received determination, with the similarity measure attribute;

creating a first transfer file that includes the transfer instance data;

transferring the first transfer file to a provider system;

receiving from the provider system a second transfer file that includes results information associated with the at least one results attribute; and storing the received at least one results attribute information in the produced transfer instance of the transfer template information definition structure.

16. The article of manufacture of claim 15, wherein the transfer instance includes a map structure to identify the managing system and to identify the provider system.

17. A computer system that includes:

a storage device associated with a managing system, wherein the storage device stores program code in one or more information structures, wherein the computer program code configures the managing system to perform a method comprising;

providing a transfer template information definition structure in a computer readable storage device associated with the managing system that includes a management information structure that identifies a managed system and that identifies respective managed code objects that run on the managed system and that includes a provider code attribute to identify provider code objects that correspond to respective managed code objects and that includes a similarity measure attribute to provide indications of similarity between the respective managed code objects and corresponding provider code objects and that includes at least one results attribute to indicate respective results for respective managed code objects;

receiving from the managed system, identification of a correspondence between a respective managed code object that runs on the managed system and a provider code object, wherein the correspondence is identified by the managed system;

receiving from the managed system, a determination of a measure of similarity between the identified managed code object and the corresponding provider code object, wherein the determination is made by the managed system;

producing a transfer instance of the transfer template information definition structure that includes transfer instance data that associates a provider code object identified, in the received identification, as corresponding to a respective managed code object with the provider object code attribute and that associated the measure of similarity, in the received determination, with the similarity measure attribute;

creating a first transfer file that includes the transfer instance data;

transferring the first transfer file to a provider system;

receiving from the provider system a second transfer file that includes results information associated with the at least one results attribute;

storing the received at least one results attribute information in the produced transfer instance of the transfer template information definition structure;

producing a user interface for managing the transfer template information structure; and producing a user interface means for viewing contents of the transfer instance.

* * * * *